United States Patent [19]

Sumida et al.

[11] 4,427,444

[45] Jan. 24, 1984

[54] METHOD OF REFINING MOLTEN METAL WITH STIRRING BY REPEATED OPERATION OF SUCTION AND DISCHARGE

[75] Inventors: Norio Sumida; Yukio Oguchi; Tetsuya Fujii; Toshihiko Emi, all of Chiba; Toshio Fujimura; Arata Ueda, both of Kurashiki; Kenichi Orito, Okayama, all of Japan

[73] Assignee: Kawasaki Steel Corporation, Kobe, Japan

[21] Appl. No.: 437,513

[22] Filed: Oct. 29, 1982

[30] Foreign Application Priority Data

Jul. 20, 1982 [JP] Japan .................. 57-126281
Jul. 20, 1982 [JP] Japan .................. 57-126282
Jul. 20, 1982 [JP] Japan .................. 57-126283

[51] Int. Cl.$^3$ .............................................. C22B 9/00
[52] U.S. Cl. ........................................ 75/93 R; 75/49; 75/61; 75/63; 75/65 R
[58] Field of Search ................. 75/93 R, 49, 61, 63, 75/65 R

[56] References Cited

U.S. PATENT DOCUMENTS 4,235,423 11/1980 Kemlo ...................................... 75/49
4,298,376 11/1981 Narita ...................................... 75/49

*Primary Examiner*—Peter D. Rosenberg
*Attorney, Agent, or Firm*—Balogh, Osann, Kramer, Dvorak, Genova & Traub

[57] ABSTRACT

A method of refining molten metal with stirring in a refining vessel by repeated operation of suction and discharge is disclosed, wherein a lower end of a refractory cylinder is immersed into a molten metal bath in the vessel and an inside of the cylinder opposite to the immersed end is alternately subjected to evacuation and pressurization. In this method, maximum and average values of pressure reduction velocity to be applied to the inside of the cylinder are limited to not more than 1,000 mmHg/sec and not more than 500 mmHg/sec, respectively, and an evacuation time is extended over at least 1.5 times intrinsic oscillation period of up and down movement of molten metal column inside the cylinder.

11 Claims, 10 Drawing Figures

FIG_6

FIG_7

FIG_8

FIG_9

FIG. 10

METHOD OF REFINING MOLTEN METAL WITH STIRRING BY REPEATED OPERATION OF SUCTION AND DISCHARGE

This invention relates to a method of refining molten metal with stirring by repeated operation of suction and discharge.

Figure 1:
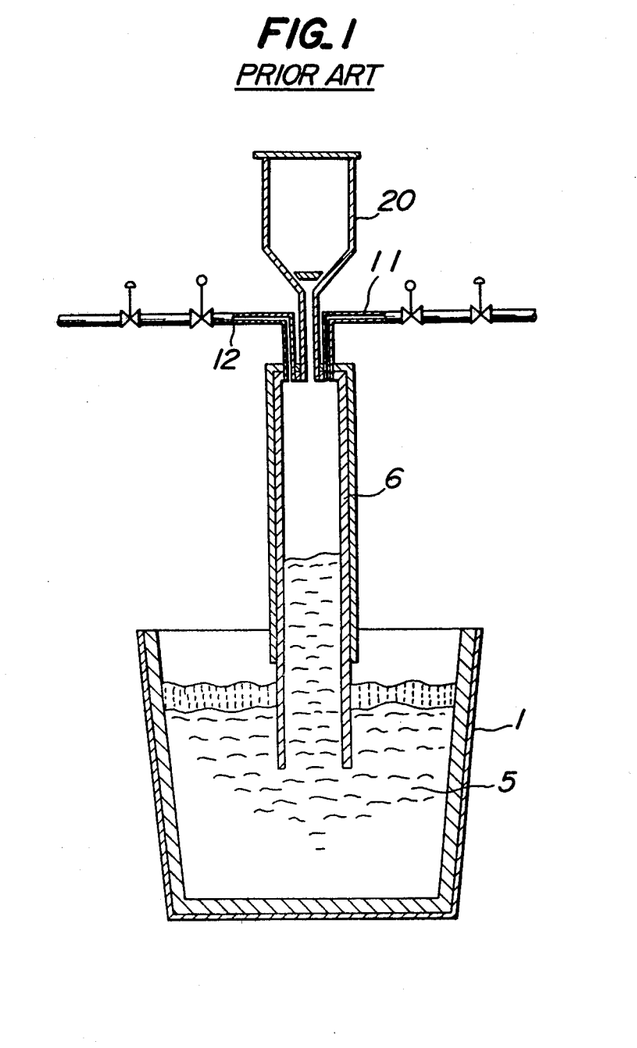
FIG. 1 is a schematic view partly shown in section of the apparatus for repeatedly performing suction and discharge as mentioned above.

As a secondary refining method for molten metal, the inventors have previously proposed an outside-furnace refining method, wherein a molten metal bath such as molten iron, molten steel or the like is contained in a refining vessel such as a ladle or the like and forcedly stirred by sucking a part of the molten metal into an inside of a cylinder made of a refractory material, whose lower end being immersed in the molten metal in the vessel, and then immediately discharging the sucked molten metal from the refractory cylinder into the vessel. According to this method, since the lower end of the refractory cylinder 6 is immersed in the molten metal 5 in the ladle 1 as shown in FIG. 1, the molten metal is violently stirred in the ladle 1 by periodically repeating a step of evacuating the inside of the upper end of cylinder 6 to suck a part of the molten metal 5 in the cylinder 6 and a step of pressurizing the inside of the upper end of cylinder 6 to vigorously discharge the sucked molten metal in the ladle 1 with the aid of the kinetic energy transferred by the discharged molten metal. In this case, deoxidizer, alloying element and the like may be added into the cylinder. These additives melt into the molten metal in an inert atmosphere without any adverse affect of slag to ensure a high yield of addition. However, this method has the following technical drawbacks for practical use though it is an excellent refining method in principle.

(1) In order to provide a sufficient stirring force, it is required to repeat a large number of rapid suctions and discharges for molten metal, so that the damage of the refractory material constituting the cylinder becomes significant and hence the operation cost becomes higher.

(2) To the inner wall surface of the cylinder is adhered a large amount of iron skull, whereby there may be caused troubles in the operation.

(3) It is difficult to remove the adhered iron skull from the inner wall surface of the cylinder (or to replace the refractory cylinder with new one).

(4) The pressurized gas may blow out from the immersed lower end of the cylinder.

In order to provide the kinetic energy required for the effective stirring, the inside of the refractory cylinder is subjected to repeated operation of pressure reduction for suction of molten metal and gas pressurization for rapid discharge on that side of the cylinder which is opposite to the immersed side, during which splashes of molten metal are produced inside the refractory cylinder in accordance with pressure change dependent upon the fluctuation of molten metal column in the cylinder. As a result, such splash adheres and deposits onto the inner wall surface of the cylinder to produce unavoidable function failures in the operation.

In actual operations on scale in the order of 300 tons, the refractory cylinder 6 as shown in FIG. 1 has an outer diameter of about 1,000 mm, an inner diameter of about 600 mm and a length of about 3,500 mm and is usually provided with pipings 11, 12 for pressurization and pressure reduction, a hopper 20 for addition of refining and/or alloying agents and the like. In such a refractory cylinder, therefore, the countermeasure for the above mentioned function failures is practically very significant.

That is, when the molten metal splashes are produced inside the refractory cylinder during the fluctuation of molten metal level in the cylinder, they adhere and deposit onto the inner wall surface of the cylinder to reduce the effective inner diameter of the cylinder, whereby the suction and the discharge are obstructed. Further, there are caused some drawbacks that a shooting hole for addition of the alloying element is narrowed to inhibit the inflow of the additives, that splashes adhere to a sight glass located in the top portion of the cylinder, and that the adhered splash is oxidized to contaminate next molten metal to be treated.

The invention will now be described with respect to the accompanying drawings, wherein.

The inventors have made studies with respect to such a splashing phenomenon of molten metal and found that splashes frequently occur at the following periods:

(i) immediately after the changeover from pressurization to pressure reduction; and (ii) latter half of pressure reduction or a period of higher vacuum degree.

The phenomenon of the above case (i) results from the fact that when the molten metal column descended at high speed by pressurization stops and ascends at succeeding pressure reduction, a large change of momentum of molten metal column is produced to necessarily make the oscillation of molten metal level violent.

Figure 2:
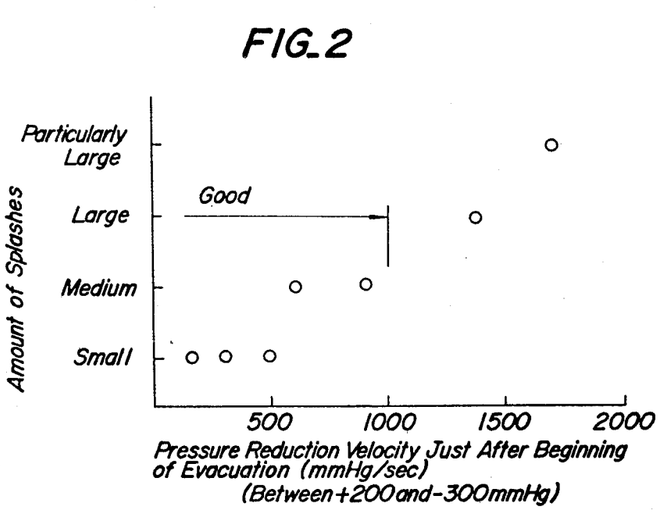
FIG. 2 is a graph showing a relation between the amount of splashes produced and the pressure reduction velocity at initial stage of evacuation operation.
Figure 3:
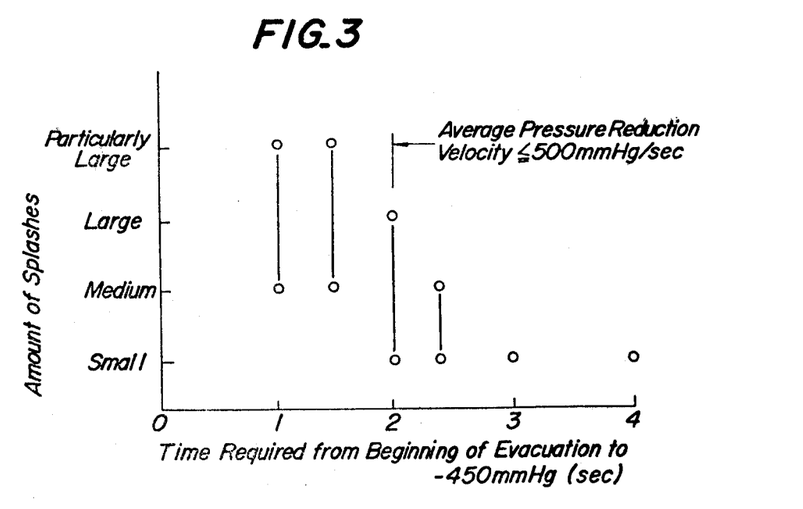
FIG. 3 is a graph showing a relation between the amount of splashes produced and the average pressure reduction velocity.

Regarding such phenomenon, the inventors have made experiments by changing the pressure reduction velocity as shown in FIG. 2 under such conditions that the maximum pressure in the pressurization is 250 to 280 mmHg, the minimum pressure in the pressure reduction is $-550$ to $-600$ mmHg and the period of pressurization and pressure reduction is 5.5 seconds and as a result, it has been confirmed that the occurrence of splash can effectively be suppressed when the pressure reduction velocity just after the beginning of evacuation is not more than 1,000 mmHg/sec.

Next, the phenomenon of the case (ii) results mainly from rapid evacuation at the latter stage of pressure reduction. That is, since the inertia of the rising movement of molten metal is large, the rapid evacuation may extremely raise the molten metal level. Besides, when the rapid evacuation is substantially coincident with the intrinsic oscillation frequency of the ascending and descending movement of molten metal, a phenomenon close to resonance takes place to produce the violent oscillation of molten metal level.

In addition to the movement of molten metal itself as described above, when the molten metal level abnormally rises, it may react with slag and iron oxide adhered to the inner wall of the cylinder by the precedent refining treatment to violently generate gases such as CO gas or the like, whereby splashes are produced. In this connection, the inventors have made further experiments and as a result, it has been confirmed that splashes hardly occur when the average pressure reduction velocity required for obtaining a predetermined value of vacuum degree of −450 mmHg is not more than 500 mmHg/sec.

Figure 4:
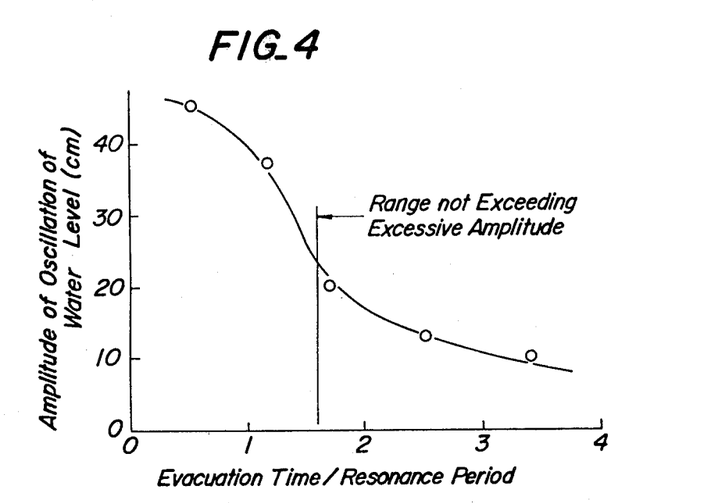
FIG. 4 is a graph showing an influence of magnification of evacuation time against resonance period upon amplitude of oscillation of molten metal level.

In order to prevent the near resonance oscillation, it is necessary to reduce the pressure over a time sufficiently longer than the period for intrinsic oscillation of the system. In this connection, water model test is carried out under such a condition that a lower end of a cylinder having an inner diameter of 30 cm is immersed in a water tank of 1 m diameter up to a depth of 200 mm and water is repeatedly subjected to suction and discharge at a water column height of 150 cm in a cylinder and at a maximum pressure in pressurization of 10 mmHg and a minimum pressure in pressure reduction of −100 mmHg, whereby the up and down movement or the oscillation of water level in the cylinder when the value of pressure reduction reaches to −100 mmHg is measured to obtain a result as shown in FIG. 4. From the result of FIG. 4, it is obvious that the amplitude of oscillation becomes sufficiently smaller when the inside of the cylinder is evacuated at a time of not less than 1.5 times the intrinsic oscillation period in the up and down movement of water. The period of the intrinsic oscillation depends upon the height of water level, but the period of intrinsic oscillation of molten metal is confirmed to be usually 1-2 seconds from many experiences for actual refining operation. The evacuation time for molten metal is to be, therefore, at least 1.5–3.0 second.

Figure 5:
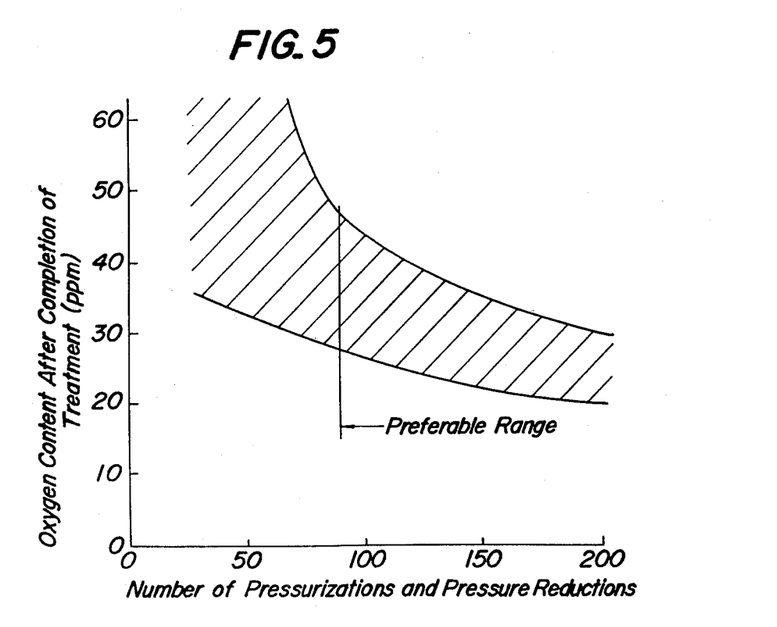
FIG. 5 is a graph showing a relation between the number of pressurizations and pressure reductions per one cycle of the refining operation and oxygen content after the completion of the operation.

On the other hand, as the evacuation time becomes longer, the number of pressurizations or the frequency of stirring by jet discharge becomes decreased and consequently a time required for the stirring is prolonged. In this connection, FIG. 5 shows a relation between the number of pressurizations and pressure reductions and the analytical value of oxygen in molten metal after the completion of the treatment as a standard illustrating the refining effect of molten metal. As apparent from FIG. 5, it is necessary that the number of pressurizations should be not less than 90 times in order to assure the refining effect. Since the total treating time is set for 15 minutes (900 seconds) as a standard in view of temperature drop and productivity, it is desirable that a time required for one cycle of suction and discharge is not more than 10 seconds in order to realize the pressurization number of 90 times.

Then, the invention will be described with reference to the means for realizing the above mentioned pressure reduction pattern.

In general, a vacuum pump has an evacuation velocity of constant volume except the case that the vacuum degree is particularly high. Therefore, such a vacuum pump is small in the evacuation capacity (or evacuation velocity of gas volume expressed by pressure and temperature at standard condition) at a high vacuum degree but considerably large in the evacuation capacity at a low vaccum degree. As a result, it is difficult to achieve the above defined evacuation velocity within a wide pressure range by the vacuum pump.

In this connection, the inventors have made various studies and found the followings:

(a) In the changeover of pressurization to pressure reduction, rapid evacuation is required, otherwise the pressurized gas blows out from the lower end of the refractory cylinder through molten metal to cause the splashing of molten metal;

(b) At an initial stage of evacuation, it is required to control the evacuation velocity, otherwise splashes are apt to occur inside the refractory cylinder by the waving of molten metal column level; and (c) At a latter half of evacuation, it is required to make the evacuation velocity large. In this stage, such a requirement is dependent upon the evacuation performance of the pump, but the evacuation capacity usually lowers as the vacuum degree becomes higher, whose compensation is difficult.

Figure 6:
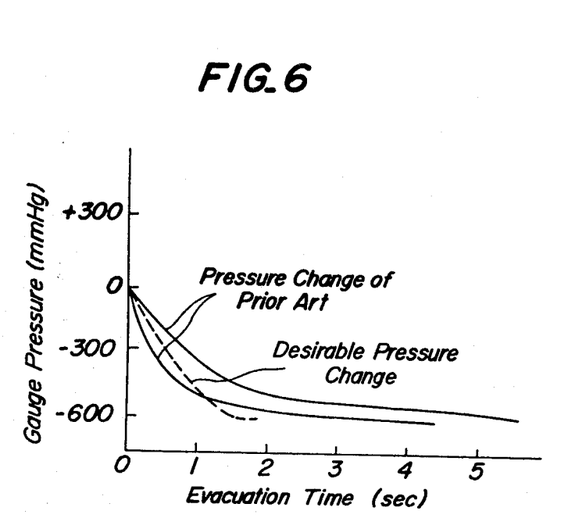
FIG. 6 is a graph showing an influence of suction control on the inner pressure change.

In fact, when the pressurization system is merely changed into pressure reduction system at a predetermined opening degree of a pumping valve, the pressure change inside the refractory cylinder is maximum at the beginning of suction stage and becomes gradually small toward the end of this stage. Such a relation is shown by solid lines in FIG. 6, from which is hardly obtained a desirable pressure change shown by broken lines.

The blowing out of the pressurized gas through molten metal due to the changeover delay to the suction stage at the end of the discharge stage is mainly prevented by properly selecting the timing of the changeover operation. On the other hand, it is difficult to avoid the occurrence of splashes from molten metal column at the beginning of the suction stage in the prior art because the drop of inner pressure based on the inertia of descending movement of molten metal column is added to the system in the changeover to evacuation, whereby the top surface of molten metal column is apt to violently wave inside the cylinder at the end of discharge stage.

As a result, splashes frequently adhere and deposit onto the inner wall surface of the refractory cylinder to reduce the effective inner diameter of the cylinder, which brings about the decrease in the jet amount of molten metal per one stroke and unavoidably reduces the stirring capability. In some cases, the deposit of splashes clogs the passages in the evacuation and pressurization systems, resulting in the function loss of these systems.

The inventors have made studies with respect to the above mentioned problems and found that these problems are solved by gradually increasing the rate of inner pressure change in the refractory cylinder from the beginning of the suction stage toward the end of this stage.

Such a suction control can easily and advantageously be carried out by successively opening plural valves arranged in parallel with each other in the evacuation system with the advancement of suction operation, or by gradually increasing the opening degree of the flow control valve in the evacuation system with the advancement of suction operation, or by successively measuring the inner pressure of the refractory cylinder, comparing the thus measured rate of inner pressure change with an index value of inner pressure change previously determined according to experiences and following up the above opening of the valve or the control of the opening degree of the flow control valve so as to meet the measured value with the index value.

Figure 7:
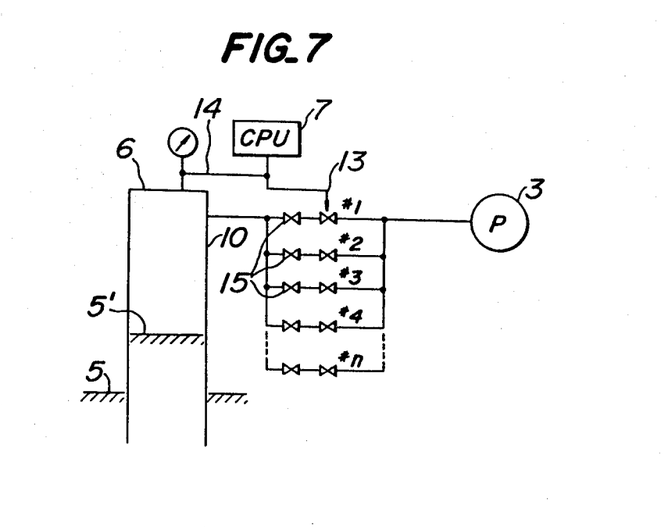
FIG. 7 is a diagram of the suction control system for performing the invention.

In FIG. 7 is shown an embodiment of the evacuation system wherein plural valves #1, 2, 3, 4 ... n arranged in parallel with each other are disposed between a top portion of a refractory cylinder 6 and a vacuum pump 3. In this figure, reference numeral 5 is a molten metal bath and reference numeral 5′ is a molten metal column located inside the cylinder at the suction stage.

As the valves #1, 2, 3, 4 ... n used are solenoid valves having a fast response, which may be operated by means of a central processing unit (CPU) 7 giving an operation instruction 13 followed to the index value of inner pressure change according to an output from an inner pressure detector 14 for the refractory cylinder.

Although the evacuation operation is a main part of the invention as previously mentioned, the pressurization stage after the completion of evacuation is also important. Especially, if the applied pressure is insufficient at the pressurization stage, the stirring force of molten metal discharged from the cylinder is deficient and the satisfactory refining effect is not obtained. While, when the applied pressure is excessively large, the pressurized gas blows out from the lower end of the cylinder into molten metal, whereby there is caused a fear of splashing molten metal. Therefore, it is necessary to maintain the pressure applied to the inside of the cylinder constant within an appropriate range in the pressurization stage.

Heretofore, it has been attempted to manually perform the correction of proper time while observing the value of maximum applied pressure $P_H$ every moment when a predetermined operation time is set in both pressurization and pressure reduction stages. However, the actual maximum applied pressure $P_H$ is frequently changed by disturbances such as change of main pressure in a pressurizing gas source, change of internal volume in the refractory cylinder and the like, and the correction thereof is not necessarily easy. Because, the supply time of the pressurized gas is within about 1 second, so that even when the control of gas supplying operation is carried out on the basis of values after the detection of inner pressure in the refractory cylinder, it is apt to be past remedy.

In this connection, the inventors have made further studies in order to satisfy the following requirements:

(1) The maximum applied pressure $P_H$ during the pressurization is gradually approached to an optimum maximum pressure $P_o$ determined according to the immersion depth of the cylinder;

(2) It is guaranteed to automatically approach the value $P_H$ to the target value $P_o$ even if other conditions change; and (3) The automating of the operation is made possible.

As a result, the inventors have found that it is advantageous to utilize a hysteresis of precedent stage, which is a near effective information, as a control factor because the present signal of pressure inside the cylinder is no longer applied to the control of pressurizing conditions as mentioned above, and the invention has also been accomplished.

In the stir-refining operation according to the invention, the optimum value of supply amount of pressurized gas after the changeover of pressure reduction stage to pressurization stage is calculated and determined from a pressure $P_{L(n+1)}$ inside the cylinder just before the changeover and a maximum pressure $P_{H(n)}$ at the last pressurization stage, whereby the maximum applied pressure $P_{H(n+1)}$ is adjusted within a proper range. According to the invention, this procedure is taken as a necessary and adequate manner at the pressurization stage or as a means for ensuring the repeated operation. In the practice of the above procedure, the supply time of the pressurized gas is properly adjusted by increasing or decreasing in accordance with a difference between the maximum applied pressure produced at the last pressurization stage $P_{H(n)}$ and the target maximum pressure $P_o$, whereby the above difference can be successively converged during the repeated pressurization stage.

The concrete procedure for pressurization stage will be described in detail with reference to FIG. 8.

Figure 8:
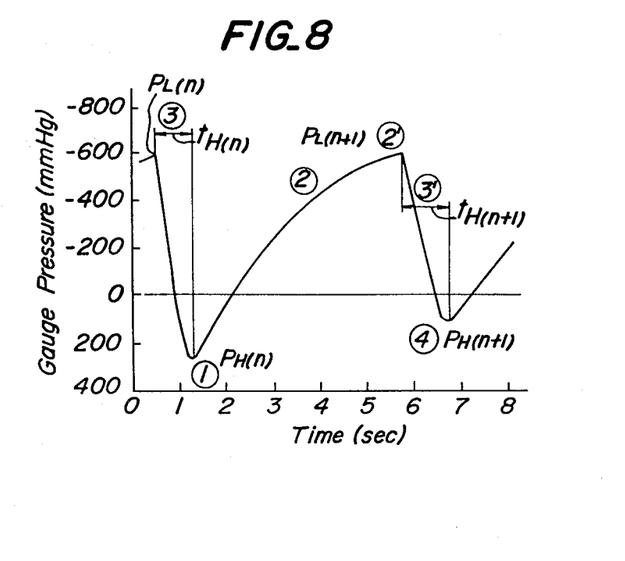
FIG. 8 is a graph showing the procedure of suction and discharge according to the invention.

At first, the maximum pressure $P_{H(n)}$ at the last (nth) pressurization stage as shown by ① in FIG. 8 is measured by a pressure measuring device and stored in a central processing unit (or a computer). During subsequent pressure reduction shown by ②, pressure is continuously measured to store as $P_{L(n+1)}$ shown by ②′. Moreover, the time required for the last pressurization stage is $t_{H(n)}$ shown by ③, and the beginning of next pressurization stage (n+1th) is a point of ending the evacuation for a predetermined time. Therefore, a next pressurizing time (for supplying the pressurized gas) $t_{H(n+1)}$ shown by ③′ is determined till the completion of evacuation.

In this case, the next pressurizing time $t_{H(n+1)}$ is calculated so as to make a difference between the target value $P_o$ and the next maximum pressure $P_{H(n+1)}$ as small as possible as compared with the difference between the last maximum pressure $P_{H(n)}$ and the target value $P_o$. The functional form for such a calculation is not particularly critical, but it may be expressed as follows.

According to experiences, pressure stroke $[P_{H(n)} - P_{L(n)}]$ is substantially proportional to the pressurizing time, so that the pressure correction for the target value $P_o$ can be made according to the following equation:

$$\frac{t_{H(n+1)}}{t_{H(n)}} = \frac{P_o - P_{L(n+1)}}{P_{H(n)} - P_{L(n)}} \tag{1}$$

According to the above equation, when the last pressure value $P_{H(n)}$ is larger than $P_o$, the next pressure value $P_{H(n+1)}$ is made small by reducing $t_{H(n+1)}$.

In the n+1th procedure, a correction term $\Delta t_{H(n+1)}$ may be added to the last value $t_{H(n)}$ according to the following equation:

$$\frac{\Delta t_{H(n+1)}}{t_{H(n)}} = \frac{[P_o - P_{H(n)}] - [P_{L(n+1)} - P_{L(n)}]}{P_{H(n)} - P_{L(n)}} \tag{2}$$

In this case, the correction width is small, so that the linear relation of equation (2) is an adequate approximation for the target value and is easy to converge into the target value.

On the other hand, the pressure reduction is small in the velocity as compared with the pressurization, so that $P_{L(n)}$ tends to be always stable (the pressurization is rapid, so that the maximum pressure is unstable). In this case, second term on the right of the numerator in equation (2) may be omitted.

Further, when the value $P_{H(n)}$ is sufficiently close to the target value ($P_{H(n)} \cong P_o$), if the denominator is approximated by a constant $\xi$, the pressurizing time can sufficiently be represented by the following simple functional form:

$$t_{H(n+1)} = t_{H(n)} + \xi[P_o - P_{H(n)}] \quad (3)$$

The target value $P_o$ is determined as follows. That is, when the immersion depth of the refractory cylinder into molten iron is d (mm), static pressure $P_s$ at the lower end of the cylinder in unit of mmHg is expressed by the following equation:

$$P_s(mmHg) = d \cdot \rho_{Fe} / \rho_{Hg}$$

wherein $\rho_{Fe}$ and $\rho_{Hg}$ are densities of Fe and Hg (g/cm³), respectively. Therefore, when the applied pressure is not more than the static pressure ($P_o \lesssim P_s$), there is no fear of blowing out the pressurized gas through molten iron.

In this connection, the inventors have made many pressurization experiments and found that since the pressurizing time is short, even if $P_o > P_s$, the pressurized gas does not blow off at $P_o < 2P_s$ but gradually blows off at $P_o > 2P_s$. Therefore, the optimum value of $P_o$ may be selected within a range of $P_s < P_o < 2P_s$. Of course, $P_o < P_s$ may be adopted when the strong stirring is not necessarily required.

The above mentioned controlling method is effective not only for the control of pressurization and pressure reduction in steady operation but also when the various operating conditions change in the run. For instance, even if the effective volume inside the cylinder changes, the applied pressure can automatically be compensated in accordance with the changed volume, while even if the main pressure for the pressurized gas changes, the optimum value of the pressurized gas can be maintained.

Moreover, the control procedure as described above is particularly effective when the target value $P_o$ is gradually changed. For instance, when $P_o$ gradually increases at the beginning of the pressurization stage, a smooth rising pattern is realized by the progressively increased pressure. Even in the course of the operation, the target value $P_o$ may easily be changed in accordance with the situations.

Figure 9:
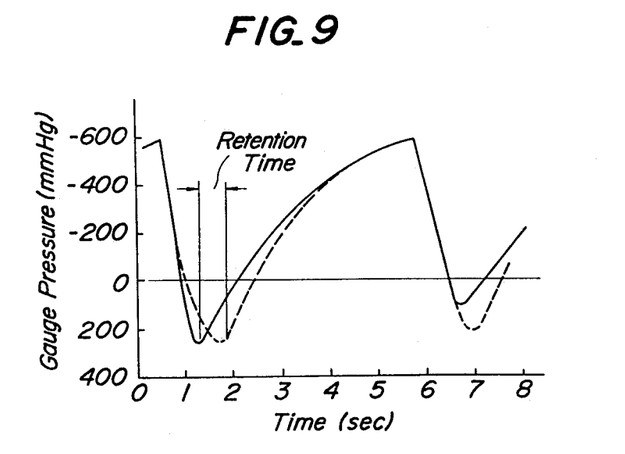
FIG. 9 is a graph showing an influence of retention time on pressure change in the changeover of pressurization to pressure reduction according to the invention.

In order to strictly control the $P_H$ value, it is effective to start the evacuation in a retention time of 0.1 to 1 second after the completion of pressurization. Because, when the evacuation is started immediately after the completion of pressurization, the peak of maximum pressure in pressurization is sharp as shown by a solid line in FIG. 9, so that there is somewhat produced an error in the measurement and control of pressure, while when the evacuation is started in the retention time of 0.1-1 second, the maximum pressure peak becomes a smooth curve as shown by dotted lines in FIG. 9 and the error is small to improve the accuracy of pressure control.

Further, the above retention time brings about an effect of reducing the change of movement of molten metal inside the cylinder in the changeover of pressurization to pressure reduction, so that the pressure control is easy. As a result, there is no fear of blowing out the gas from the lower end of the cylinder and also a risk of producing splashes from the molten surface inside the cylinder becomes small. The reason why the retention time is limited to the range of 0.1-1 second is due to the fact that when the retention time is less than 0.1 second, there is no effect for improving the control accuracy, while when the retention time exceeds 1 second, the treating time becomes prolonged as a whole.

In the practice of the invention, the lower end of the refractory cylinder is first immersed in molten metal bath contained in a refining vessel and covered with a slag layer without regard to the penetration of the slag layer into the inside of the cylinder. Therefore, it is necessary to remove the slag layer from the inside of the cylinder before the suction stage according to the invention. For this purpose, the slag layer penetrated into the cylinder is slowly discharged from the inside of the cylinder into molten iron bath by progressively increasing the pressure inside the cylinder.

The invention will be described with reference to the following examples.

EXAMPLE 1

In a ladle was stirred 280 t of molten steel by repeated operation of suction and discharge using a refractory cylinder with an inner diameter of 600 mm and a length of 3,000 mm.

In such a repeated operation, initial maximum pressure reduction velocity was 550 mmHg/sec and average pressure reduction velocity during the pressure reduction were maintained at 350 mmHg/sec. Moreover, the maximum applied pressure and the maximum reduced pressure were 350 mmHg and −550 mmHg (gauge pressure), respectively.

After the refining of 18 heats, iron skull deposited onto the inner wall of the cylinder had a thickness of about 15 mm and a total weight of about 120 kg (or approximately 7 kg per one heat).

For the comparison, the stirring in the ladle was performed by the conventional suction and discharge method. In this case, the initial pressure reduction velocity was about 1,200 mmHg/sec, and the average pressure reduction velocity for reducing to −550 mmHg was 580 mmHg/sec, which were outside the ranges defined in the invention.

In the conventional method, splashes violently rose due to the waving of molten metal level in the cylinder and consequently iron skull of about 20 kg per one heat deposited onto the inner wall of the cylinder. In order to remove such deposited iron skull, it had been required to dismantle the cylinder after the refining of about 15 heats.

As apparent from the above, according to the invention, the effective mitigation of splashes produced inside the refractory cylinder is realized without degrading the refining efficiency and hence the number of inspection and repairs for the cylinder can advantageously be reduced.

EXAMPLE 2

In the apparatus shown in FIG. 7, five valves #1-5 were arranged in parallel with each other and actuated in this order every the lapse of 0, 1, 2, 3 and 5 seconds from the beginning of evacuation. Moreover, a throttle valve 15 was disposed between each of the valves #1–5 and the cylinder 6, whereby the evacuation velocity just after the beginning of the evacuation was adjusted to be sufficiently small.

Figure 10:
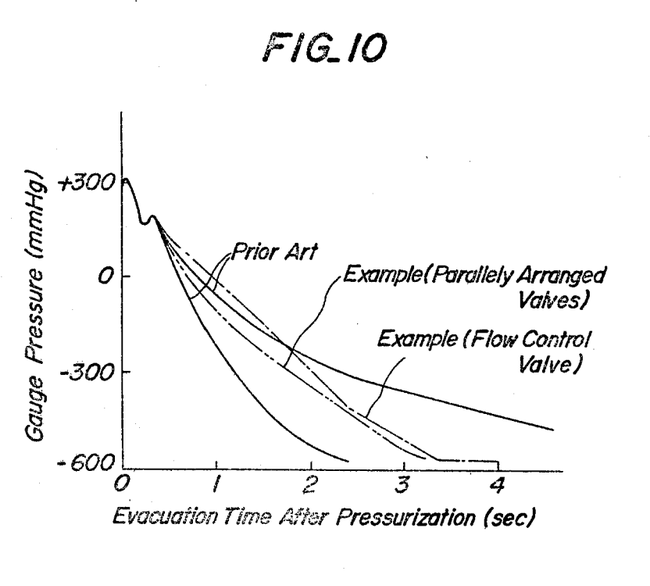
FIG. 10 is a graph showing the trajectory of pressure change by suction control according to the invention.

The evacuation operation was made by using the above apparatus to obtain a result as shown in FIG. 10. As apparent from FIG. 10, the reduced pressure was reached to a target value of −600 mmHg for about 3 seconds. Moreover, the evacuation result using a flow control valve instead of the five valves is also shown in FIG. 10.

In the case of the conventional evacuation method shown by solid lines, it is necessary to increase the flow resistance of the valve in order to suppress excessive evacuation at the beginning of the suction stage. For this purpose, the evacuation time of 8.5 seconds was required till the reduced pressure reached to the target value of −600 mmHg. If the predetermined treating time of molten iron is 10 minutes, therefore, the number of pressurizations and pressure reductions by the conventional method was only 65 times, which was one half of 130 times realized in the invention.

As apparent from the above, according to the invention, the pressure reduction velocity is minimum in a short time just after the beginning of sucking molten iron column into the inside of the cylinder, whereby the waving of the top surface of molten iron column is effectively suppressed. Further, the ascending of molten iron column to the required height can be ensured by gradually increasing the rate of inner pressure change from the beginning of suction stage toward the end thereof without prolonging the necessary evacuation time, during which the occurrence of splashes is effectively prevented inside the cylinder.

As a result, there is caused no fear of reducing the draw amount of molten iron due to the reduction of the effective inner diameter of the cylinder or obstructing functions of pressurization and pressure reduction systems and hence it makes possible to effectively and properly perform the stir-refining operation.

EXAMPLE 3

In the system of FIG. 1, the maximum applied pressure $P_H$ during the pressurization was set to be 320 mmHg (gauge pressure) when the immersion depth of the refractory cylinder was 400 mm. At the pressurization stage, the pressurizing time was controlled by using the aforementioned equation (1) as a functional form for converging the applied pressure to the set value, whereby $P_H$ was stably maintained within a range of 320 mmHg±30 mmHg. As a result, satisfactory stirring was realized and there was caused no blowing out of molten iron from the cylinder due to super-atmospheric pressure.

For the comparison, the conventional stir-refining method was performed by making each of the pressurization and pressure reduction times constant. In this case, it was required to somewhat reduce the amount of pressurized gas with anxiety of blowing out the gas from the cylinder. As a result, the maximum applied pressure at the pressurization was only 180 mmHg on the average during the refining and the stirring force was somewhat insufficient.

As apparent from the above, when the stir-refining of molten iron bath is carried out using the refractory cylinder by controlling the pressurization stage according to the above mentioned functional form, it makes possible to give maximum stirring energy without a fear of splashing the bath due to the blowing out of the pressurized gas and the effective refining operation of this type can be realized stably and efficiently.

The refining method according to the invention is particularly effective in such a non-steady operation that the operating conditions change. For instance, so far as the change of main pressure for the pressurized gas is not too abrupt (or when such a change takes a sufficiently long time as compared with the pressurizing cycle), it can be compensated automatically. Furthermore, when the target value $P_o$ is successively changed, or when the value $P_o$ is progressively made large just after the beginning of the treatment, the maximum applied pressure can easily be followed to the change of $P_o$. Even if the treating conditions (e.g. the volume inside the cylinder and the like) change in the course of the treatment, the maximum applied pressure can be always maintained at a predetermined level.

Furthermore, the invention is the control of pressurizing time, but if the time is made constant, the flow rate of pressurized gas may be changed. The latter case corresponds to optional change in the opening degree of flow control valve. In this case, the optimum conditions for the next pressurization is determined by measuring the pressure inside the cylinder.

Moreover, the pressurizing conditions can be determined by measuring the movement of molten metal column itself instead of the inner pressure. For instance, the displacement of molten metal level is measured by using a microwave or an electromagnetic wave. That is, the displacement of molten metal being an electrically-conductive fluid can be electromagnetically measured by disposing a sensing coil in the outer portion of the cylinder or the refractory wall, or the detection of molten metal passing through the contact position is easy when using a proper electrical contact. The calculation of the above pressurizing condition based on such detection information of molten metal is more preferable for the precise control. In this case, the following equation may be used in correspondence with equation (3):

$$\Delta t_H = \{X_o - X_{(n)}\} \cdot \xi \quad (4)$$

wherein $X_o$ is a lowest position of molten metal level to be predetermined and $X_{(n)}$ is an actual position of molten metal level in the last pressurization. Equation (4) shows a correction term of the pressurizing time, which is proportional to the deviation from the target value.

What is claimed is:

1. A method of refining molten metal with stirring by repeated operation of suction and discharge of the molten metal, the method comprising immersing a lower end of a refractory cylinder into a molten metal bath contained in a refining vessel, alternately subjecting the inside of an upper end of the cylinder opposite to the immersed lower end thereof, to pressure reduction and pressurization to forcibly stir the molten metal bath due to repeated suction of the molten metal into the cylinder and rapid discharge thereof, the pressure reduction velocity having predetermined values of not more than 1,000 mmHg/sec at an initial stage of evacuation and not more than 500 mmHg/sec at a later stage of evacuation required for obtaining a predetermined value of vacuum degree of −450 mmHg, and extending evacuation time over a period of at least 1.5 times a period of oscillation of a molten metal column having a predetermined height range in the cylinder.

2. A method according to claim 1, wherein said evacuation time is not more than 10 seconds.

3. A method according to claim 1, wherein a rate of inner pressure change at the suction stage is gradually increased from the beginning of evacuation toward the end thereof.

4. A method according to claim 3, wherein plural valves arranged in parallel with each other in an evacuation system are successively opened to adjust the rate of inner pressure change.

5. A method according to claim 3, wherein an opening degree of a flow control valve arranged in an evacuation system is progressively increased to adjust the rate of inner pressure change.

6. A method according to claim 4 or 5, wherein the opening of the valve(s) is followed by meeting the rate of inner pressure change measured inside the cylinder with a predetermined index for inner pressure change.

7. A method according to claim 1, wherein a maximum applied pressure $P_{H(n+1)}$ is adjusted within an appropriate range by calculating and determining an optimum value for supply amount of pressurized gas after the changeover of pressure reduction stage to pressurization stage from a pressure $P_{L(n)}$ inside the cylinder just before the changeover and a maximum applied pressure $P_{H(n)}$ at the last pressurization stage.

8. A method according to claim 7, wherein a supply time of pressurized gas is adjusted by increasing or decreasing in accordance with a difference between the maximum applied pressure $P_{H(n)}$ at the last pressurization stage and the target maximum pressure $P_o$.

9. A method according to claim 1, wherein the evacuation is started in 0.1 to 1 second after the completion of pressurization.

10. A method according to claim 1, wherein an appropriate value of supply amount of pressurized gas at next pressurization stage is determined on the basis of a signal of molten metal position obtained by measuring the position of molten metal surface inside the cylinder in optical, electrical or electromagnetic manner.

11. A method according to claim 1, wherein the period of oscillation of the molten metal column in the cylinder is 1–2 second and the evacuation time is at least 1.5–3.0 second.

* * * * *